April 20, 1937.  A. S. FINK  2,077,471
AIRCRAFT
Filed May 4, 1935  4 Sheets-Sheet 1
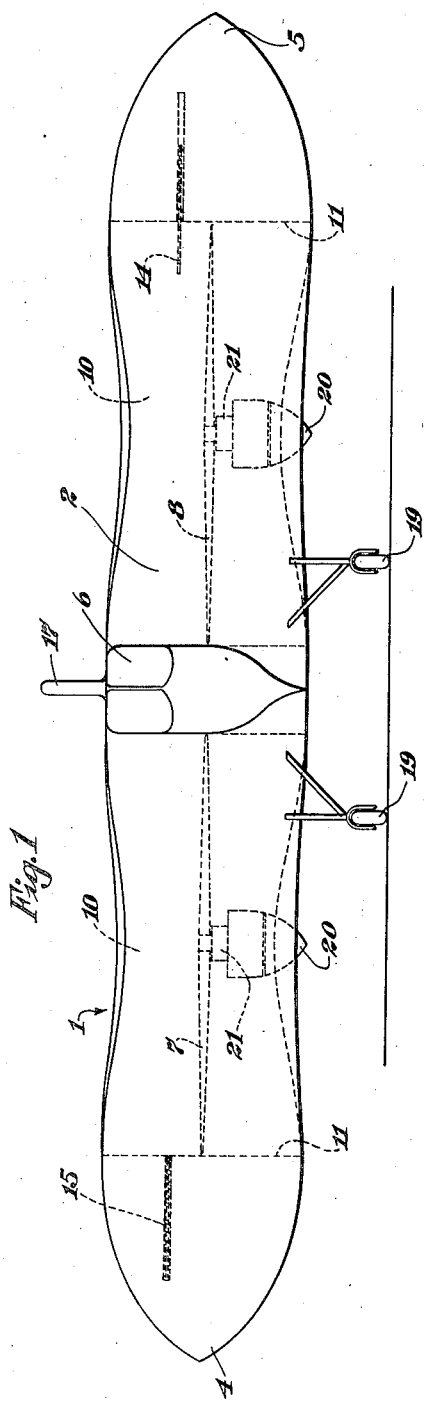
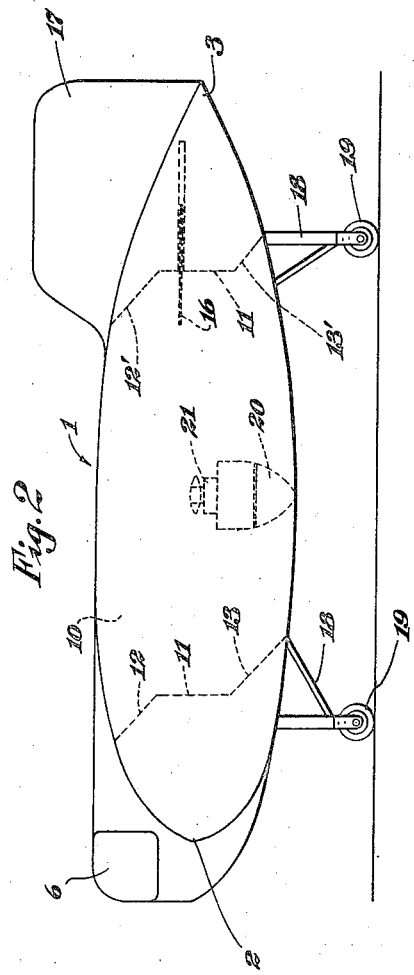
INVENTOR,
Abraham S. Fink,
BY
Bartlett Eyre Scott Keel
ATTORNEYS.

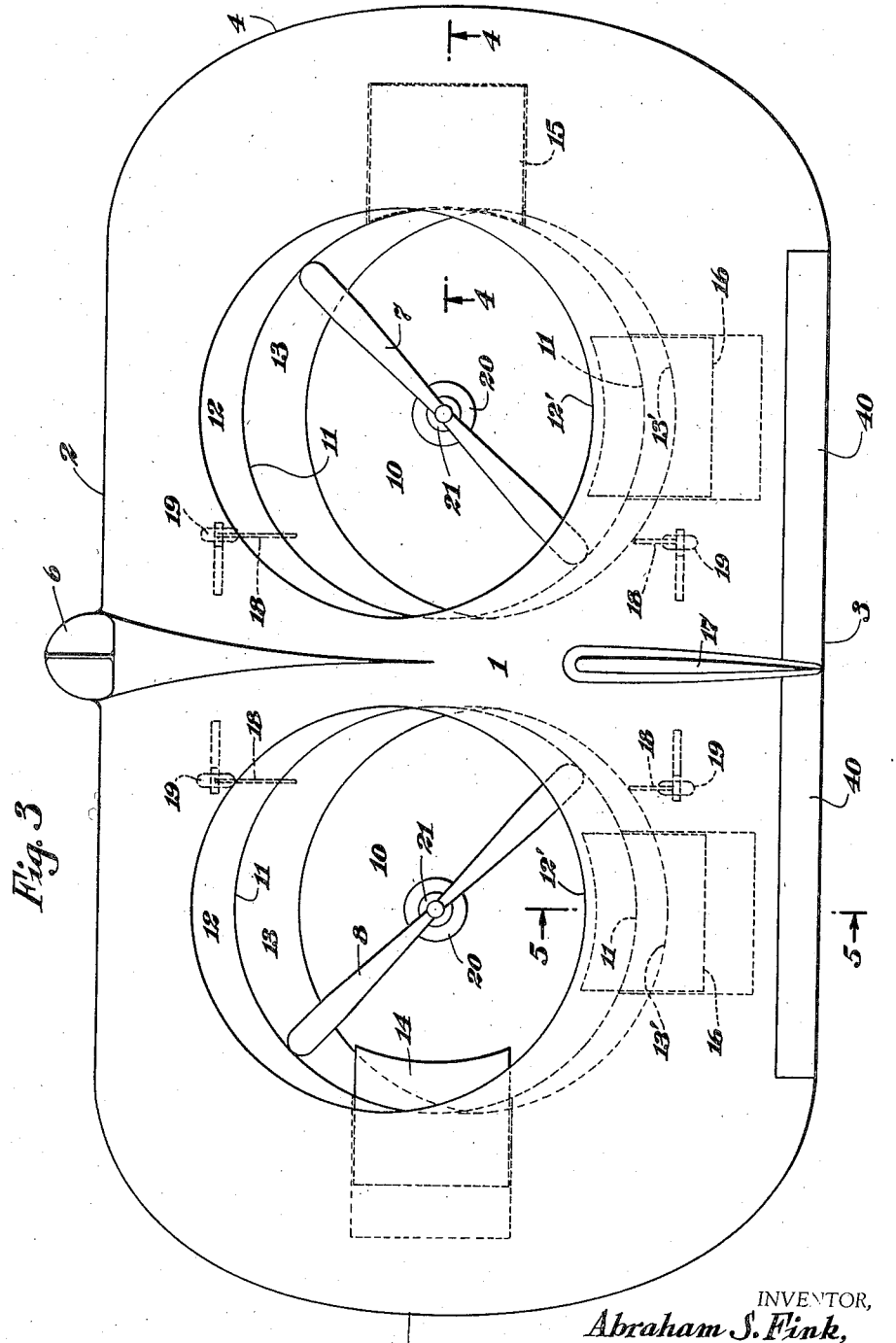

April 20, 1937.   A. S. FINK   2,077,471
AIRCRAFT
Filed May 4, 1935    4 Sheets-Sheet 3
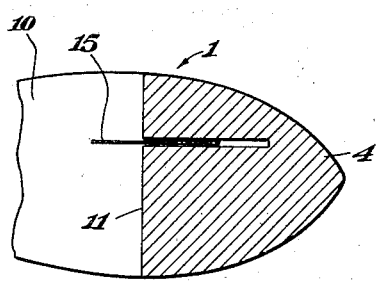
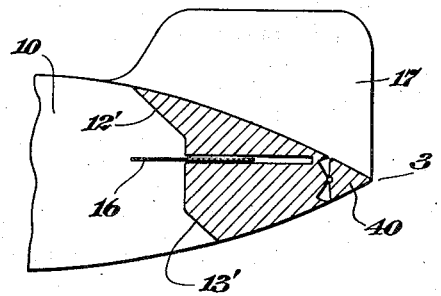
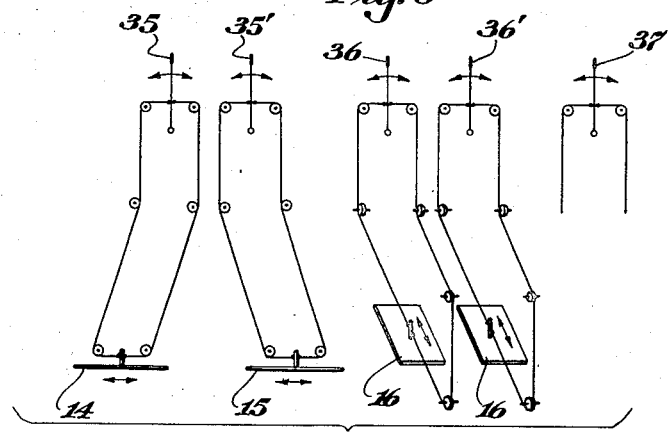
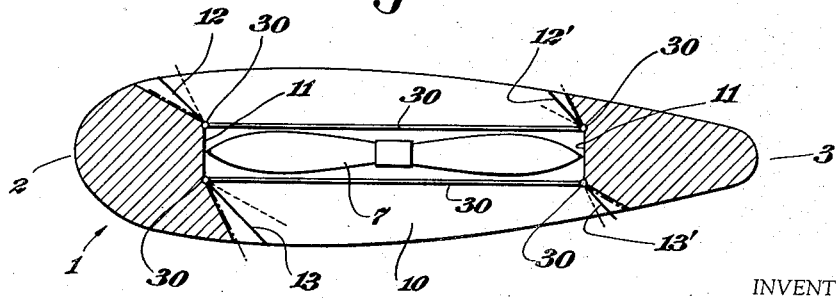
INVENTOR,
Abraham S. Fink,
BY
Bartlett Eyre Scott Keel
ATTORNEYS.

April 20, 1937.   A. S. FINK   2,077,471
AIRCRAFT
Filed May 4, 1935   4 Sheets-Sheet 4
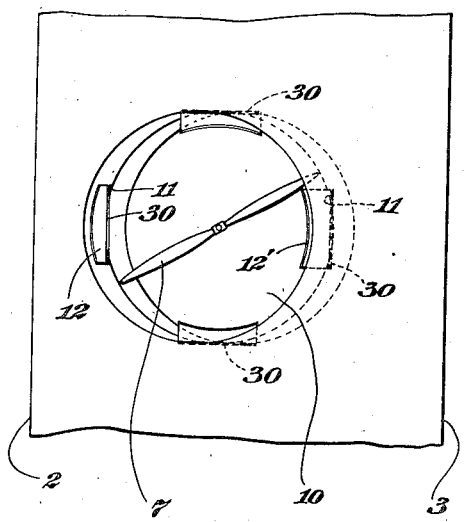
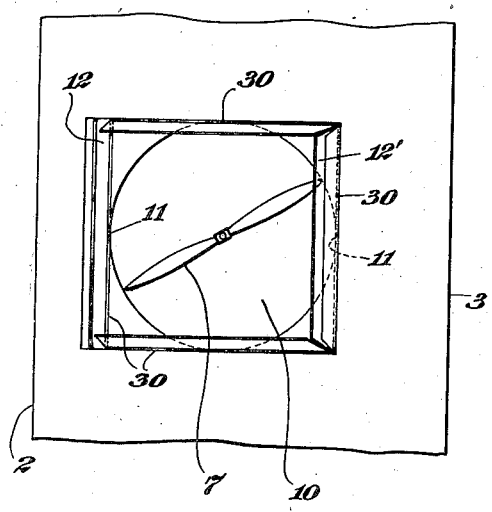
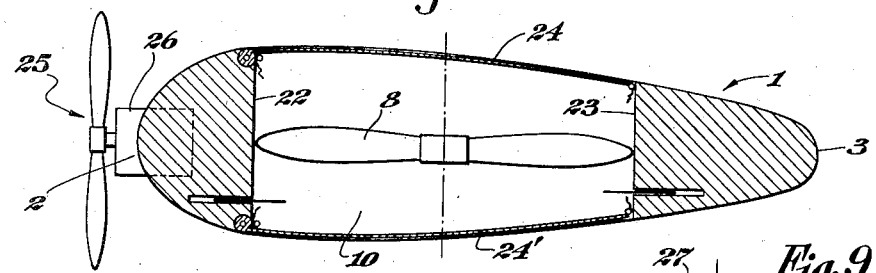
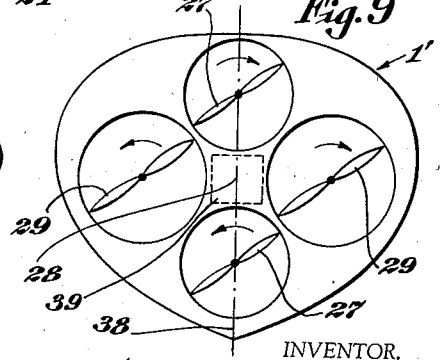
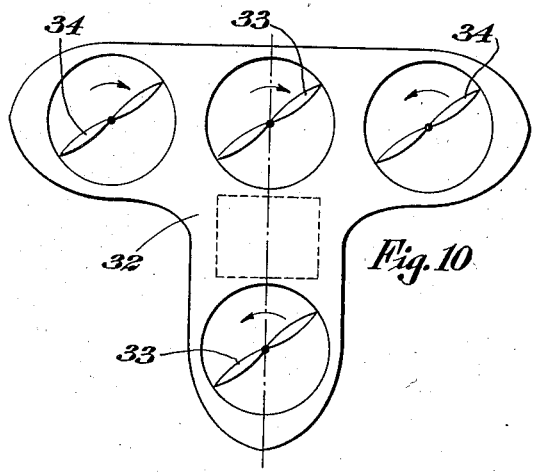
INVENTOR,
Abraham S. Fink,
BY
ATTORNEYS.

Patented Apr. 20, 1937

2,077,471

UNITED STATES PATENT OFFICE 2,077,471

AIRCRAFT

Abraham S. Fink, Gloversville, N. Y., assignor to Aero Improvements, Inc., New York, N. Y., a corporation of New York Application May 4, 1935, Serial No. 19,776

15 Claims. (Cl. 244—12)

This invention relates to aircraft and particularly to aircraft of the heavier-than-air type, although certain features thereof are applicable to lighter-than-air craft.

One object of the invention is a novel method and means for obtaining direct lift in aircraft.

A further object of the invention is a novel craft in which both direct lift and thrust in any desired direction can be obtained in an efficient manner.

A further object of the invention is a direct lift craft in which effective control is available at all times, namely when the craft is rising, hovering, descending, or moving horizontally or with components of any of these movements.

A further object of the invention is a novel aircraft in which the drag or resistance to lateral flight is reduced to a minimum.

A further object of the invention is a direct lift aircraft which is capable of being lifted vertically or substantially vertically with a substantial useful load by means of standard power equipment.

A further object of the invention is an aircraft in which the power plant including the propeller is streamlined against resistance to lateral flight without at the same time impairing the lifting and propelling operations.

A further object of the invention is an aircraft of the heavier-than-air type in which aerofoil lifting surfaces may be entirely dispensed with if desired.

Other objects of the invention will hereinafter appear.

For a better understanding of the invention reference may be had to the accompanying drawings forming a part of this application wherein:

Fig. 1 is a front view of an aircraft embodying my invention;

Fig. 2 is a side view thereof;

Fig. 3 is a plan view thereof;

Figs. 4 and 5 are sectional views along the lines 4—4 and 5—5 respectively of Fig. 3;

Fig. 6 is a diagrammatic view of the control operating means;

Figs. 7, 7a, and 7b are diagrammatic views indicating different settings of the duct wall vanes;

Fig. 8 is a diagrammatic view of a craft embodying the invention and an auxiliary power plant; and Figs. 9 and 10 are diagrammatic views of modified power plant arrangements.

Referring to the drawings, which are purposely diagrammatic, the framework of the machine is contained within a streamlined housing 1, having a leading edge 2, a trailing edge 3, and lateral edges 4 and 5. A cabin 6 is indicated substantially midway between the lateral edges 4 and 5 and is disposed adjacent or at the leading edge of the housing. It preferably extends slightly forward of the leading edge 2 and is streamlined into the housing 1. This cabin is for the accommodation of the pilot or passengers or both. The framework containing the housing 1 must be of sufficient width in fore and aft direction and sufficient length in the transverse direction to accommodate within the streamlines of the housing two or more propellers, a pair of such propellers 7 and 8 being shown in the embodiment of Figs. 1-3. These propellers are indicated as being mounted for rotation in substantially horizontal planes and, in the particular embodiment shown, in planes disposed substantially midway of the upper and lower sides of the housing 1, although the propellers may in certain cases rotate in planes at an acute angle to the upper and lower sides of the housing. The propellers are disposed and housed within ducts or tunnels 10 preferably substantially cylindrical in section and extending from the under side up through the frame and housing 1 through the upper side thereof. The propellers just clear the central vertical walls 11 of these ducts and they operate to draw the air from above the craft down through the ducts 10 to create the lift.

The propellers 7 and 8 may not only be used to create lift, but also to give lateral propulsion to the craft. This is effected, in the particular embodiment of Figs. 1, 2, and 3, by inclining the fore and aft walls of the ducts 10 or certain parts thereof in the fore and aft direction. For example, the fore vertical section 11 merges into an upper section 12 capable of being inclined, as indicated in Fig. 2, to different positions and merges into a lower section 13 which extends rearwardly in substantial parallelism with the section 12 and which is also capable of being inclined to different positions. The aft section 11 of the duct wall merges into upper and lower sections 12' and 13' which are disposed generally in parallel relation with the parts 12 and 13. This results in the mouth or upper end of the duct 10 being disposed substantially in advance fore and aft of the exit or lower side of the duct. By this means the propellers 7 and 8 not only impart direct lift to the craft, but also a propulsion component for movement in the lateral direction. The wall sections 11, 12 and 13 and 11', 12', and 13' are illustrated as forming broken lines in section and this is the preferred construction, but they may form a continuous curve or may form a substantially straight line. The sections 12 and 13 and 12' and 13' may be movable about the center sections 11 as pivotal points to vary the component of lateral thrust and when they are in the vertical plane of the central section 11 no forward propulsive effect is obtained.

In the particular embodiment of Figs. 1, 2, and 3 duct wall sections 12, 13 and 12', 13' are indicated as fixed and are shaped to form a generally cylindrical mouth and exit. The thrust for forward propulsion is, therefore, obtained by the inclination of the upper and lower portions of the wall ducts forward and backward respectively. Sidewise thrust for motion from left to right or vice versa can be obtained by lateral inclinations of the side walls of the ducts. The provision for side thrust is shown in Figs 7a and 7b and the craft may thereby be caused to assume an altogether sidewise movement, an altogether forward movement or components of both sidewise and forward movements.

A lateral control means may be provided for impeding the flow of air through the duct on the side to be lowered. I have indicated such means diagrammatically at 14 and 15 which, in the particular embodiment shown, comprises movable vanes which may be caused to project into the ducts as indicated. These vanes in the particular embodiment of Figs. 1, 2, and 3 are shown disposed above the level of the propellers but they may be disposed below the level if desired. The movement of one of the vanes 14 and 15 to project into the duct not only reduces the direct lift but it also at the same time reduces the propulsive effect on that side of the craft and thus a turn of the craft may be executed at the same time. These vanes preferably obstruct the passage of the air on the lateral sides of the ducts.

Longitudinal control may be effected by obstructing the passage of air either in the rear or the forward half of the duct, this resulting in the shifting of the center of pressure to cause a pitch or reverse moment. For example, I have shown movable vanes 16 which may also be mounted either below or above the level of the propellers and in the particular embodiment shown in Figs. 1, 2, and 3 these vanes 16 are disposed above the level of the propellers and on the rear half of the ducts. These rear vanes 16 can be also used in making the turn, as for example by moving them differentially with respect to each other or by causing only one of them to project into the duct.

The craft may also be provided with stabilizing surfaces fixed or movable, such for example as the stabilizing pin 17 for directional stability.

The craft is also provided with suitable landing gear, as for example the four landing gears 18, carrying the fully swivelled wheels 19, so that the machine can be landed in any direction of movement.

The propellers 7 and 8 may be driven from a single power plant or from individual power plants and in the particular embodiment shown in Figs. 1, 2, and 3 I have indicated individual power plant engines 20 geared to the propellers through the reduction gears 21. Preferably, as shown, the housing and the framework is sufficiently deep to completely or almost completely house the engines 9. Where the propellers are driven by individual power plants synchronization of the motor speeds may be promoted by a duct connecting the intake manifolds of the two engines 20 which ducts serve to equalize the pressures in the two manifolds.

The movable fore and aft sections of the duct wall 12, 13 and 12', 13', which are shown in their different position in Fig. 2, may be sections of a cylindrical wall as shown in Fig. 7a or as shown in Fig. 7b they may be formed of plane surfaces. By differentially adjusting them on opposite sides of the axis a differential in thrust may be obtained to produce a turning moment or yaw about a central vertical axis and if they are moved in unison in the same direction the forward thrust may be controlled to regulate the forward speed.

With the walls of the ducts similarly movable on the sides of the ducts, a sidewise component in thrust or sidewise thrust may be also obtained as is described above and that side component may vary by varying such side walls.

Any suitable construction may be provided for these variable surfaces, such for example as that shown in Figs. 7, 7a, and 7b, where the wall sections 12, 13 and 12', 13' are pivoted on transverse axes 30, with side wall sections similarly mounted on longitudinal axes. The upper and lower parts of the ducts thus depart from the cylindrical shape of the central section 11 and the side movable walls corresponding to walls 12, 13, and 12', 13' may be fastened thereto by flexible fabric joints to permit the relative movements and at the same time closing the duct. Any suitable means may be provided for moving these surfaces at the will of the pilot.

In Fig. 8 the fore and aft walls 22 and 23 of the duct are indicated as being vertically disposed and, accordingly, the propellers with the walls of the duct thus vertically disposed impart only a lift and no component of thrust in any direction. In this embodiment or with this adjustment a conventional propeller 25 is provided for obtaining the thrust for translational movement, the housing I functioning as an ordinary aeroplane aerofoil or lift wing. If desired, the duct 10 may be closed both at the top and bottom by closures 24 and 24', these closures being in position only when the direct lift propellers 7 and 8 are not functioning. When it is desired to use direct lift propellers it is only necessary to remove the covers 24 and 24' whereupon the machine again acts as a direct lift aeroplane. These closures 24, 24' may be of any suitable construction to permit of moving to and from closed position, such as that indicated.

Fig. 9 shows a modified arrangement where four direct lift power plants are provided. A pair of fore and aft propellers 27 are disposed in corresponding ducts symmetrically disposed on opposite sides of the vertical central axis 28 of the machine and a pair of propellers 29 are disposed symmetrically about the longitudinal vertical center plane of the machine and on the axis of the central vertical axis 28. In the particular embodiment here shown the propellers 27 are of smaller diameter than the propellers 29 with corresponding different sizes of ducts. The cabin is here disposed about the central vertical axis 28 and may project slightly above or below the streamlined housing I' for the purpose of getting good vision. The ducts in which the propellers 27 and 29 are disposed preferably have their walls formed and variable similarly to the walls 12, 13 and 12', 13' of Figs. 1, 2, and 3, and also they are provided with one or more of the control vanes 14, 15, and 16.

Fig. 10 shows still another differently formed housing 32 in the form of a T with the cross forming the leading part and the stem the trailing part. If desired, the cross may be the trailing part and the T the leading part. Here also, as in Fig. 9, there are four propellers, two propellers 33 disposed on the longitudinal center line of the machine and two propellers 34 disposed in the cross and in line with one of the propellers 33. The walls of the four ducts accommodating these propellers are preferably likewise inclined at least at the fore and aft parts thereof to obtain components of thrust in the fore and aft direction and also control vanes similar to the vanes 14, 15 and 16 are preferably provided for enabling the pilot to control the craft.

While I have shown two or more propellers in each craft, it is understood that both the direct lift and propulsion principles of the craft are applicable to craft having a single direct lift propeller. Certain of the control features are also present with a single propeller craft. Where more than two direct lift propellers are provided, it is preferred to provide an even number of propellers, as for example 2, 4, 6, etc. The turning torque of the propellers may be counteracted by causing one propeller or group of propellers to rotate in one direction and the other propeller or group of propellers to rotate in the opposite direction.

In Fig. 6 I have shown diagrammatically a means 35, 35' under the control of the pilot for manipulating the control means 14 and 15 and the means 36, 36' for controlling the vanes 16. A similar means 37 is indicated for moving the duct walls 12 and 13 and 12' and 13'. These various means may comprise vertical sticks hooked up to the surfaces to be moved by cables as shown.

At 40 are indicated (Fig. 3) ailerons for longitudinal control if needed. In the embodiments of Figs. 9 and 10 the longitudinally displaced power plants and ducts give effective longitudinal control by adjustments of the duct walls.

A craft embodying my invention may thus be lifted directly and vertically into the air or it may be given a thrust component in any direction desired, all by means of the same power plant or plants and with a simplified construction of the craft. The pilot has perfect control of the machine at all times whether ascending, descending or in translational movement and certain features of the invention are, therefore, applicable to lighter-than-air craft. The structure is characterized by the greatest simplicity, and resistance to movement in any direction is minimized due to the fact that practically the whole mechanism is contained within the streamlined housing. Substantially the only exposed parts are the landing gears and these may be streamlined to reduce to a minimum the resistance.

I claim:

1. In an aircraft, a framework having a streamlined housing therefor, said framework having two or more ducts symmetrically disposed with respect to the central longitudinal axis of the craft and extending down through the housing, said ducts having rigid walls, propellers in said ducts rotating in planes approximating parallelism with the central horizontal plane through the craft, power means for driving said propellers, certain portions of the walls of said ducts having movable surfaces therein inclined to the planes of revolution of the propellers whereby the propeller is caused to give variable components of thrust at right angles to the planes of revolution and means for operating said inclined surfaces and modifying the flow through one or more of the ducts for assisting in controlling the craft.

2. In an aircraft, a framework having a streamlined housing therefor, said framework having two or more ducts symmetrically disposed with respect to the central longitudinal axis of the craft and extending down through the housing, said ducts having rigid walls, propellers in said ducts rotating in planes approximating parallelism with the central horizontal plane through the craft, power means for driving said propellers, certain portions of the walls of said duct having movable surfaces therein inclined to the planes of revolution of the propellers whereby the propeller is caused to give variable components of thrust at right angles to the planes of revolution and means for operating said inclined surfaces and modifying the flow through one or more of the ducts for assisting in controlling the craft, the means for controlling the craft comprising laterally disposed devices which are projectable into the paths of the flow through the ducts.

3. In an aircraft, a framework having a streamlined housing therefor, said framework having two or more ducts symmetrically disposed with respect to the central longitudinal axis of the craft and extending down through the housing, said ducts having rigid walls, propellers in said ducts rotating in planes approximating parallelism with the central horizontal plane through the craft, power means for driving said propellers, certain portions of the walls of said ducts having movable surfaces therein inclined to the planes of revolution of the propellers whereby the propeller is caused to give variable components of thrust at right angles to the planes of revolution and means for operating said inclined surfaces and modifying the flow through one or more of the ducts for assisting in controlling the craft, the control means comprising longitudinally disposed devices projectable into the path of the flow through the duct.

4. In an aircraft, a framework having a streamlined housing therefor, said framework having two or more ducts symmetrically disposed with respect to the central longitudinal axis of the craft and extending down through the housing, said ducts having rigid walls, propellers in said ducts rotating in planes approximating parallelism with the central horizontal plane through the craft, power means for driving said propellers, certain portions of the walls of said ducts having movable surfaces therein inclined to the planes of revolution of the propellers whereby the propeller is caused to give variable components of thrust at right angles to the planes of revolution and means for operating said inclined surfaces and modifying the flow through one or more of the ducts for assisting in controlling the craft, the control means comprising both laterally disposed and longitudinally disposed devices which are projectable into the paths of flow through the ducts for the purpose set forth.

5. In a craft of the character set forth in claim 1 wherein the angularity of the inclined portions of the wall are variable at the will of the pilot.

6. In a craft of the character set forth in claim 1 wherein the inclined portions of the duct walls are variable at the will of the pilot and both laterally disposed and longitudinally disposed control devices are provided for projection into the paths of flow through the ducts.

7. In a craft of the character set forth in claim 1 wherein the framework and housing form an aerofoil surface of substantial depth and an aspect ratio of at least that shown in Figs. 1 to 3, whereby in addition to the lift and thrust imparted directly by the propellers an additional lift is obtained through translational movement through the air.

8. In an aircraft of the character set forth in claim 1 wherein the propellers may be caused to impart a thrust either longitudinally of the craft or at an angle thereto at the will of the pilot.

9. In an aircraft, a framework having a streamlined housing therefor, said framework having two or more ducts symmetrically disposed with respect to the central longitudinal axis of the craft and extending down through the housing, said ducts having rigid walls, propellers in said ducts rotating in planes approximating parallelism with the central horizontal plane through the craft, power means for driving said propellers, certain portions of the walls of said ducts having movable surfaces therein inclined to the planes of revolution of the propellers whereby the propeller is caused to give variable components of thrust at right angles to the planes of revolution and means for operating said inclined surfaces and modifying the flow through one or more of the ducts for assisting in controlling the craft, the ducts with propellers constituting an even number, symmetrically distributed about a vertical axis of the craft.

10. In an aircraft, a framework having a streamlined housing therefor, said framework having two or more ducts symmetrically disposed with respect to the central longitudinal axis of the craft and extending down through the housing, said ducts having rigid walls, propellers in said ducts rotating in planes approximating parallelism with the central horizontal plane through the craft, power means for driving said propellers, certain portions of the walls of said ducts having movable surfaces therein inclined to the planes of revolution of the propellers whereby the propeller is caused to give variable components of thrust at right angles to the planes of revolution and means for operating said inclined surfaces and modifying the flow through one or more of the ducts for assisting in controlling the craft, an auxiliary propeller for translational movement being provided with means for closing the ducts and discontinuing the operation of one or more of the horizontally disposed propellers at the will of the pilot.

11. In an aircraft of the character set forth in claim 1 wherein the power plane means is totally enclosed within the streamlines of the frame housing.

12. In an aircraft of the character set forth in claim 1 wherein the propellers are disposed midway in depth of the ducts.

13. In an aircraft, a framework having a streamlined housing therefor, said framework having two or more ducts symmetrically disposed with respect to the central longitudinal axis of the craft and extending down through the housing, said ducts having rigid walls, propellers in said ducts rotating in planes approximating parallelism with the central horizontal plane through the craft, power means for driving said propellers, certain portions of the walls of said ducts having movable surfaces therein inclined to the planes of revolution of the propellers whereby the propeller is caused to give variable components of thrust at right angles to the planes of revolution and means for operating said inclined surfaces and modifying the flow through one or more of the ducts for assisting in controlling the craft, the propellers being disposed midway the depth of the ducts with the inclined portions of the duct walls vertically displaced from the plane of revolution of the propellers.

14. In an aircraft of the character set forth in claim 1 wherein the propellers are disposed intermediate the mouths and exits of the ducts and are driven by directly geared engines also mounted within said ducts.

15. In an aircraft, a streamlined framework, said framework comprising two or more spaced direct lift airflow openings passing from the under side up through the upper side of the streamlined framework, a direct lift propeller disposed in each of said openings and rotating in an approximately horizontal plane in one direction only, means for driving said propellers, said openings having wall portions closely confining said propellers and also wall portions inclined at an angle to the planes of revolution of the propellers, whereby the propellers are caused to impart both a direct lift and a translational thrust to the craft, and means for varying the flow through one of said openings independently of the speed and direction of rotation of the propeller for establishing a difference in lift on the opposite sides of an axis disposed between said propellers and thereby securing a controlling couple without impairing the direct lift effect of the lift propellers.

ABRAHAM S. FINK.

CERTIFICATE OF CORRECTION.

Patent No. 2,077,471.  April 20, 1937.

ABRAHAM S. FINK.

It is hereby certified that error appears in the printed specification of the above numbered patent requiring correction as follows: Page 4, first column, line 54, claim 11, for the word "plane" read plant; and that the said Letters Patent should be read with this correction therein that the same may conform to the record of the case in the Patent Office.

Signed and sealed this 1st day of June, A. D. 1937.

(Seal)

Henry Van Arsdale
Acting Commissioner of Patents.